(12) United States Patent
Shaw et al.

(10) Patent No.: US 10,039,006 B2
(45) Date of Patent: Jul. 31, 2018

(54) METHOD AND SYSTEM PROVIDING LOCAL DATA BREAKOUT WITHIN MOBILITY NETWORKS

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/369,861

(22) Filed: Dec. 5, 2016

(65) Prior Publication Data

US 2018/0160311 A1    Jun. 7, 2018

(51) Int. Cl.
*H04W 16/08* (2009.01)
*H04W 16/32* (2009.01)
*H04L 29/12* (2006.01)
*H04W 88/16* (2009.01)

(52) U.S. Cl.
CPC .......... *H04W 16/08* (2013.01); *H04W 16/32* (2013.01); *H04L 61/6068* (2013.01); *H04W 88/16* (2013.01)

(58) Field of Classification Search
CPC ......... H04L 41/18; H04L 41/41; H04L 12/28; H04L 12/2801; H04L 12/2803; H04L 12/2807; H04L 61/6022; H04L 2012/40234; H04L 61/2514; H04L 61/2535; H04L 29/06333; H04L 29/08648; H04L 29/12103; H04W 8/08; H04W 8/082; H04W 8/087; H04W 8/14; H04W 15/16; H04W 16/18; H04W 16/20; H04W 16/08; H04W 16/012; H04W 16/32; H04W 16/00; H04W 16/14; H04W 16/24; H04W 16/26; H04W 16/28; H04W 28/08; H04W 28/10; H04W 28/16; H04W 72/00; H04W 72/0406; H04W 72/0426; H04W 72/0486;
(Continued)

(56) References Cited

U.S. PATENT DOCUMENTS 9,119,016 B2   8/2015  Durand et al.
9,225,587 B2  12/2015  Zhang et al.
9,301,333 B2   3/2016  Choi et al.
(Continued)

*Primary Examiner* — Meless Zewdu
(74) *Attorney, Agent, or Firm* — Guntin & Gust, PLC; Douglas Schnabel

(57) ABSTRACT

Aspects of the subject disclosure may include, for example, identifying a mobile device in communication with a small-cell via managed spectrum, wherein the small-cell is located at a subscriber premises, and wherein the small-cell is in further communication with a mobile network core. Each of a first Internet protocol (IP) address and a second IP address are associated with the mobile device, which accesses network traffic using one of the first IP address, the second IP address or both. Offload traffic associated with the mobile device is identified, wherein the offload traffic is exchanged between the mobile device and the small-cell at the subscriber premises using the managed spectrum. The offload traffic is associated with the first IP address, wherein user data are exchanged between the mobile device and other equipment at the subscriber premises without the user data being exchanged with the network core. Other embodiments are disclosed.

20 Claims, 9 Drawing Sheets

(58) Field of Classification Search
CPC . H04W 80/06; H04W 88/00; H04W 88/0005; H04W 88/02; H04W 88/08
See application file for complete search history.

(56) References Cited

U.S. PATENT DOCUMENTS

| | | |
|---|---|---|
| 9,401,962 B2 | 7/2016 | Parker et al. |
| 9,445,341 B2 | 9/2016 | Spinelli et al. |
| 2008/0285492 A1* | 11/2008 | Vesterinen ............ H04W 8/082 370/310 |
| 2011/0182227 A1* | 7/2011 | Rune .................... H04W 8/082 370/312 |
| 2011/0282931 A1* | 11/2011 | Chen .................. H04L 29/1216 709/245 |
| 2012/0140749 A1* | 6/2012 | Caldwell ............... H04W 48/18 370/338 |
| 2012/0184266 A1* | 7/2012 | Faccin .................. H04W 48/08 455/426.1 |
| 2013/0010756 A1 | 1/2013 | Liang et al. |
| 2014/0023044 A1* | 1/2014 | Sjolinder ............ H04L 67/1095 370/331 |
| 2014/0254382 A1 | 9/2014 | Randriamasy et al. |
| 2014/0349611 A1 | 11/2014 | Kant et al. |
| 2015/0257038 A1* | 9/2015 | Scherzer ............. H04L 12/1478 370/329 |
| 2015/0295833 A1* | 10/2015 | Mizukoshi ............ H04L 47/125 370/235 |
| 2016/0021588 A1 | 1/2016 | Kamdar et al. |
| 2016/0095042 A1 | 3/2016 | Wadhwa |
| 2016/0174191 A1* | 6/2016 | Singh .................... H04W 68/12 370/329 |
| 2016/0183156 A1* | 6/2016 | Chin ................. H04W 36/0022 370/331 |
| 2016/0295614 A1 | 10/2016 | Lee et al. |
| 2017/0026887 A1* | 1/2017 | Sirotkin ............... H04W 28/08 |
| 2017/0034761 A1* | 2/2017 | Narayanan .......... H04L 12/1407 |
| 2017/0164419 A1* | 6/2017 | Kim .................... H04W 76/028 |
| 2017/0303189 A1* | 10/2017 | Hampel ................ H04W 48/20 |

* cited by examiner

450

METHOD AND SYSTEM PROVIDING LOCAL DATA BREAKOUT WITHIN MOBILITY NETWORKS

FIELD OF THE DISCLOSURE

The subject disclosure relates to method and system providing local data breakout within mobility networks.

BACKGROUND

A mobile cellular network is a communication network in which a last link is wireless. Cellular networks are distributed over land areas in which coverage is provided by a number of cells. Each cell is served by at least one fixed-location transceiver, known as a macro cell site or base station. The cell sites are in communication with a mobile cellular core network by way of a backhaul network. The core network is in further communication with one or more other networks, such as a Public Switched Telephone Network (PSTN), the Internet, and the like, allowing mobile communications devices to wirelessly access voice and/or data services by way of the macro cell sites.

Wireless links served by the macro cell sites are generally constrained to licensed portions of the radiofrequency spectrum. Depending on locations of the mobile devices, wireless connectivity may be weak or otherwise unavailable. For example, mobile devices operating within buildings can often experience weak signals and/or complete loss of signals to/from the macro cell site. Alternatively or in addition, some cell sites can experience congestion during periods of heavy usage that can result in limited service.

Small cells are relatively low-powered radio access nodes that operate in licensed, and in some instances unlicensed, portions of the radiofrequency spectrum. The small cells generally have a limited range and can operate in an overlapping fashion, within a coverage region of one or more macro cell sites. For example, small cells can be used within buildings to extend coverage and/or improve signal quality. Alternatively or in addition, small cells can be used at locations that experience heavy usage, such as arenas, and the like. Small cell traffic is integrated into a mobile carrier's core network by way of a backhaul network that can include a broadband internet service provider network.

BRIEF DESCRIPTION OF THE DRAWINGS

Reference will now be made to the accompanying drawings, which are not necessarily drawn to scale, and wherein.

DETAILED DESCRIPTION

Figure 1:
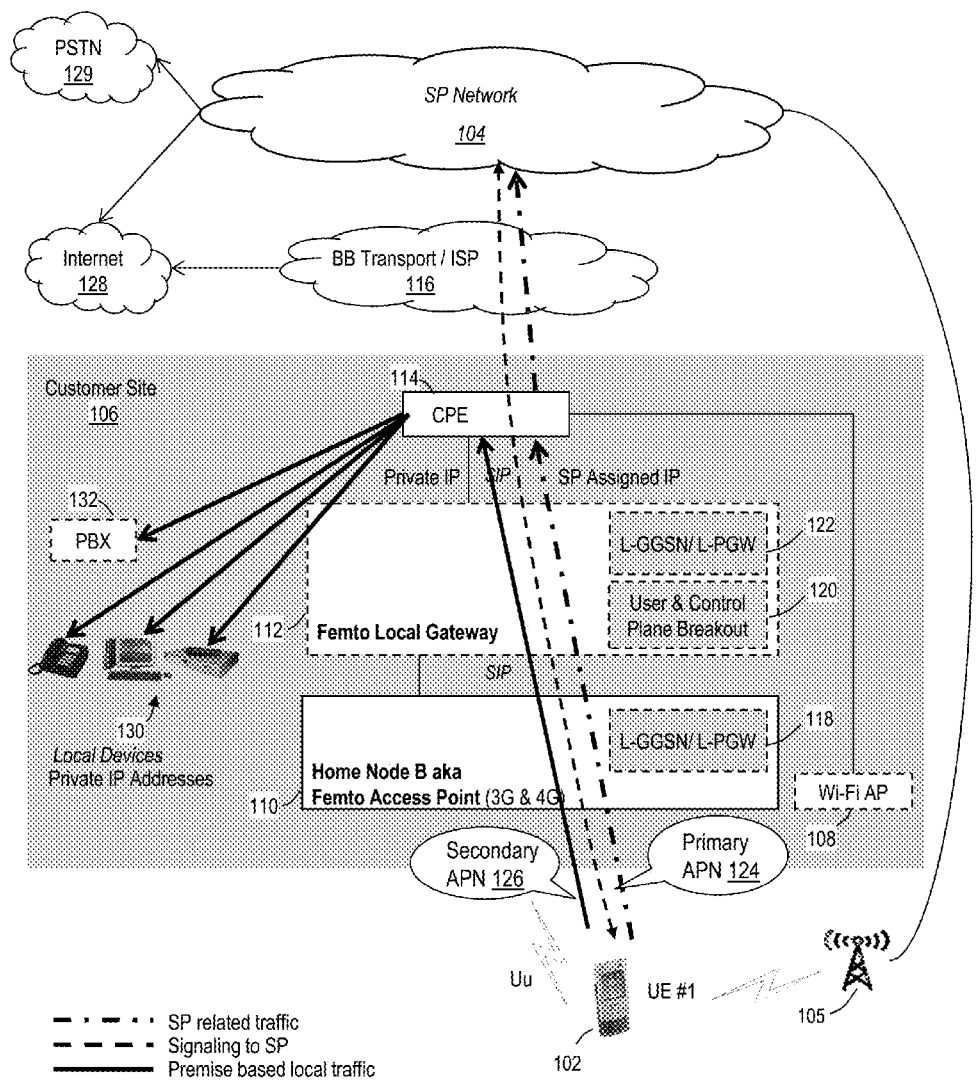
FIG. 1 depicts an illustrative embodiment of a mobile communication system.

The subject disclosure describes, among other things, illustrative embodiments for integrating a local internetworking module with a small cell to facilitate a local breakout of mobile user traffic operating in the licensed spectrum to local terminals and/or local network access points, without requiring that the user traffic be directed through a mobility core network. The ability to locally access, e.g., breakout, mobile communications traffic facilitates a traffic steering and/or separation capability by which remote traffic is allowed to continue through a service provider's mobility core network, while local traffic is separated and steered through a local network e.g., a home network and/or enterprise network. Other embodiments are described in the subject disclosure.

Consumers today are equipped with wide range of intelligent communications devices including smartphone's and personal digital assistants (PDAs). Additionally, there are increasing numbers of smart appliances (e.g., TVs, PCs, fax machines, smoke alarms, security cameras, microwave ovens, refrigerators, sprinklers, etc.) that are either resided at a home, customer premises, and/or business enterprise.

These smart devices and/or appliances can significantly assist consumers by reaching out to the Internet for wide ranges of activities, e.g., including social networking, blogging, media streaming and surfing the Internet. Such activities can produce a tremendous amount of traffic, which would currently be handled through a mobile service provider's cellular network. Under current subscriber plans, such heavy data usage can become cost prohibitive for the consumers.

Techniques disclosed herein take advantage of situations in which a substantial amount of traffic is "localized" to a customer's premises, home, and/or enterprise. Through application of the example devices, systems and/or process presented herein, such localized traffic can be directed and/or re-directed, e.g., in an alternative fashion, without necessarily having to go through the mobile service provider's network.

One or more aspects of the subject disclosure include a device having a processing system that includes a processor and a memory that stores executable instruction. The instructions, when executed by the processing system, facilitate performance of operations. The operations include identifying a mobile device, wherein the mobile device is in communication with a small-cell access point via managed cellular frequency spectrum. The small-cell access point is located at a subscriber premises, and is in further communication with a network core of a mobile cellular network that services network traffic among a plurality of cellular access points comprising a macro-cell base station and the small-cell access point. Each of a local Internet protocol (IP) address and a global IP address is associated with the mobile device, wherein the mobile device accesses network traffic using one of the local IP address, the global IP address or both. Offload traffic is distinguished from non-offload traffic associated with the mobile device, wherein the offload traffic and the non-offload traffic are exchanged with the mobile device at the subscriber premises using the managed cellular frequency spectrum. The offload traffic is associated with the local IP address. The offload traffic includes a signaling portion and a user data portion, wherein user data messages of the user data portion are exchanged with the mobile device at the subscriber premises without the user data messages being exchanged with the network core.

One or more aspects of the subject disclosure include a process that identifies a mobile device in communication with a small-cell via managed spectrum. The small-cell is located at a subscriber premises and in further communication with a mobile network core. Each of a first IP address and a second IP address are associated with the mobile device, which accesses network traffic using one of the first IP address, the second IP address or both. Offload traffic associated with the mobile device is identified, wherein the offload traffic is exchanged between the mobile device and the small-cell at the subscriber premises using the managed spectrum. The offload traffic is associated with the first IP address, wherein user data are exchanged between the mobile device and other equipment at the subscriber premises without the user data being exchanged with the network core.

One or more aspects of the subject disclosure include a machine-readable storage medium, including executable instructions that, when executed by a processing system including a processor, facilitate performance of operations. The operations include identifying a wireless communications device in communication with a small-cell access point via managed cellular frequency spectrum. The small-cell access point is located at a subscriber premises and is in further communication with a network core of a mobile cellular network. A wireless communications device address is determined of a first address and a second address of the wireless communications device. The wireless communications device accesses network traffic using the wireless communications device address. Network messages associated with the wireless communications device are determined that can be steered based on the wireless communications device address. The network messages are exchanged between the wireless communications device and the small-cell access point at the subscriber premises using the managed cellular frequency spectrum. The network messages are associated with the first address, wherein user data are exchanged between the wireless communications device and other equipment at the subscriber premises by way of the network messages, without the user data being exchanged with the network core.

Within widely adopted standards of the 3$^{rd}$ Generation Partnership Project (3GPP), any Packet Data Protocol (PDP) context activation by mobile subscriber device has to be related to an Access Point Name (APN) provisioned to that mobile subscriber device. The techniques disclosed herein apply multiple APN's to mobile subscriber devices to be used in association with small cells, such as femtocells. For example, one APN can be used for local traffic, including local internet traffic when so provided, while another APN can be used for be for all other traffic that would be handled by the mobile service provider network, e.g., directing signaling and user data through a mobility core portion of the mobile service provider network.

Through application of the illustrative techniques disclosed herein, a subscriber can simultaneously use their mobile phone to access a service of a mobile service provider, e.g., using the provider's mobility core network, while also downloading a file from their phone to a home computer. This can be accomplished using two distinguishable IP addresses for the same phone. Namely, one IP address can be provided by a local router, while the other IP address can be provided by the mobile service provider, e.g., as their own subscriber IP address for the subscriber's phone.

FIG. 1 depicts an illustrative embodiment of a mobile communication system 100. In particular, the system 100 includes a service provider network 104 that facilitates mobile cellular services to one or more wireless communications devices, referred to generally as mobile stations and/or User Equipment (UE) 102. The UE 102 can include mobile phones, smart phones, laptop computers, tablet computers, media processors, smart televisions, and the like. It is understood that in at least some applications, the UE 102 can include machines configured to engage in machine-type-communications, sometimes referred to as machine-to-machine (M2M) communications, e.g., according to Internet of Things (IoT) applications. Such machines can include, without limitation, electronic equipment, such as printers, entertainment systems, security systems, residential and/or industrial appliances, such as washers and dryers, environmental control systems, vehicles, utility meters, and the like.

The service provider network 104 includes a core network system that facilitates provisioning and delivery of mobile services to one or more UE 102 according to one or more mobile cellular technologies. Cellular technologies can include, without limitation, CDMA-1X, UMTS/HSDPA, GSM/GPRS, TDMA/EDGE, EV/DO, WiMAX, SDR, LTE, as well as other next generation wireless communication technologies as they arise. Mobile services according to one or more of the foregoing cellular technologies are sometimes differentiated according to generations of wireless technologies. Example wireless technologies include, without limitation, 2G, 3G, 4G, 4G Long Term Evolution (LTE), 4G LTE Advanced, 5G, and the like. It is understood that the devices, systems and/or processes disclosed herein can be applied to one or more of the cellular technologies according to one or more of the various generations.

In some embodiments, communications between the UE 102 and the mobile service provider network 104 can be accommodated by way of a macro cell tower 105. Wireless coverage of the macro cell 105 is generally provided within a geographical region based on a macro cell size, a cell sector and/or one or more allocated, e.g., licensed, segments of managed radio frequency spectrum or channel(s). Macro cell size is relatively large, often measured on a scale of miles and/or kilometers. Alternatively or in addition, the UE 102 can communicate with the mobile service provider network 104 by way of a small-cell. Small cells are generally understood to include relatively low-powered radio access nodes or base stations that can operate in licensed and/or unlicensed spectrum, but over a geographic region that is smaller than that served by the macro cell 105. One or more small cells are in communication with core networks of the service provider networks 104, and/or the Internet, and/or other networks, by way of a backhaul communications link or network.

Examples of small cells include, without limitation, femtocells, picocells and microcells. Small cells generally include small wireless base stations that allow a service provider to extend service coverage indoors and/or at the cell edge, e.g., where access would otherwise be limited or unavailable. Femtocells operate over a relatively short wireless range and over a limited number of channels. They are primarily used in residential and/or small business applications. Picocells typically cover a slightly larger area than femtocells, such as offices, shopping malls, train stations, and/or vehicles, such as cruise ships and/or aircraft. Such small cells are typically used to extend wireless service coverage to indoor areas where outdoor signals may not reach well, and/or to add network capacity in areas with very dense phone usage, such as train stations or stadiums.

The illustrative system 100 includes an example of communications equipment at a customer site 106. The customer site can include, without limitation, a home, e.g., a single-family or multi-family dwelling, a business, and/or, more generally, any public or private place, such as a school, a library, an arena or stadium, a store, a shopping mall, a shopping district, a neighborhood, transportation applications, such as busses, airplanes and/or ships.

The customer site 106 can include one or more local devices 130, such as local telephones, Voice over IP (VoIP) devices, media processors, e.g., set-top boxes, digital video recorders (DVRs), fax machines, computers, printers, and the like. In at least some applications, the customer site 106 can include a private branch exchange (PBX) 132 (shown in phantom). A PBX 132 is generally understood to include a system that connects telephone extensions to a Public Switched Telephone Network (PSTN) 129 and provide internal communications, e.g., internal short-form telephone extensions, for a business. In some applications the PBX 132 includes an IP PBX that provides IP connectivity, e.g., providing additional audio, video, or instant messaging communication utilizing a TCP/IP protocol stack.

The customer site 106 also includes Customer Premises Equipment (CPE) 114 that facilitates communication connectivity with one or more of the mobile service provider network 104, the Internet 128 and/or the PSTN 129. For example, the CPE 114 can include a basic cable modem, e.g., a cable modem with a Local Area Network (LAN) router. The CPE 114 communicates with local devices 130 through LAN connections and with remote devices, such as the mobile service provider network 104 or the Internet through a broadband transport network 116. Broadband transport networks can include, without limitation, a cable provider network, a fiber distribution network, Digital Subscriber Line (DSL), and the like. In some embodiments, the broadband transport network 116 is provided by an Internet service provider, e.g., accessible via a cable mode, a fiber modem, and the like. It is understood that the Internet service provider may be the same entity as the mobile service provider or a different entity, including entities that may be in direct competition in at least some segments of the digital subscriber services market.

In some embodiments, the CPE 114 can include a media processor, such as a set-top box, a gateway processor, such as a residential gateway, a satellite receiver, and the like. The CPE 114 can be in local communication with one or more devices at or near the customer site, such as the example local devices 130 and/or the PBX 132. It is understood that such local devices can be provided with a local or private IP address that is observable and/or otherwise accessible by other devices on the LAN, but not observable to other remote devices, e.g., by way of the Internet 128. Such local IP addresses can be assigned by a local device, such as the CPE 114 and/or other local network device.

In at least some embodiments the CPE 114 includes or is otherwise in local communication with a wireless access point 108 (shown in phantom). The wireless access point can operate in unlicensed portions of the spectrum, e.g., according to wireless LAN protocols, such as the IEEE 802.11 wireless LAN protocols. Such unlicensed wireless access points can be distinguished from small cells that operate in licensed portions of the spectrum, e.g., in the same portion(s) of licensed spectrum used by a macro cell site 105.

The customer site 106 also includes a small cell 110. In the illustrative example, the small cell is a femtocell, sometimes referred to as a femtocell access point 110. According to the illustrative example, the femtocell access point 110 provides a home Node B, e.g., according to 3G and/or 4G technologies. The femtocell access point 110 supports Radio Access Network (RAN) portion of a mobile telecommunication system. The RAN can support establishment of wireless connectivity between the femtocell access point 110 and the UE 102, e.g., according to a wireless communications protocol, such as 3G and/or 4G technologies. In particular, the wireless connectivity is provided over one or more channels of licensed radio frequency spectrum, within the limited range of the femtocell access point 110 that may include channel(s) that overlap with licensed radio frequency spectrum of a corresponding macro cell 105 that may provide overlapping coverage.

It is understood in at least some applications that the UE 102 is pre-registered or otherwise authorized for operation within the RAN of the femtocell access point 110. Such pre-registration can limit access to employees of a business, residents of a home, and the like. Alternatively or in addition, the femtocell access point 110 can provide a public access RAN allowing access, e.g., temporary access, to UE 102 without requiring pre-registration.

The UE 102 can establish communications with the mobile service provider network 104 through the femtocell access point 110, e.g., when the UE 102 is within range of the femtocell access point 110. Such communications can include signaling messages that can be used to identify the UE 102, to request establishment of a communications session, e.g., a voice call and/or data session, and the like. The signaling messages are routed between the UE 102, the femtocell access point 110 and/or network nodes of the mobile service provider network 104, e.g., network nodes of the core network, according to signaling interfaces and/or signaling protocols, sometimes referred to as a control plane. Similarly, the communications can include user data messages used to carry voice and/or data communications between the UE 102 and other devices and/or systems according to applicable applications. Examples of applications include, without limitation, VoIP, web browsing, click streams, streaming media, e.g., streaming video and/or audio, text messages, e.g., SMS, multimedia messages, e.g., MMS, email, electronic gaming, text, file transfer, image sharing, and the like.

According to typical femtocell access point operation, signaling messages are exchanged between one or more of the UE 102, the femtocell access point 110 and one or more core network nodes of the mobile service provider network 104. The signaling messages can be used to establish a first RAN bearer between the UE 102 and the femtocell access point 110 and a second data bearer between the femtocell access point 110 and one or more nodes of the service provider network 104. Data bearers established in this manner can be used to transfer user data between the UE 102 and a remote destination, e.g., a remote called/calling telephone, and/or a remote data destination, such as a web site and/or other IP accessible device. To this end, the mobile service provider network 104 assigns an IP address to the UE 102 as a source/destination for IP messages.

The UE 102 is configured with an Access Point Name (APN) identifier. The mobile service provider, upon a request for service, examines the APN identifier associated with the UE 102 and provides or otherwise assigns an IP address to the UE 102. IP messages are transferred accordingly, through the core network of the mobile service provider 104, according to the UE's IP address. In this manner, user data communications between the UE 102 and the Internet, and/or between the UE 102 and one or more of the local devices 130 and/or PBX 132 are routed through the core network of the mobile service provider 104, subject to regular rates and limits.

According to the techniques disclosed herein, the UE 102 can be configured with more than one APN identifiers. For example, a first APN identifier corresponds to a first APN, e.g., a traditional APN, used to assign an IP address that results in exchanges of user data, e.g., data bearer traffic, routed through the core network of the mobile service provider network 104. Additionally, the UE 102 can be configured with a second APN. The second APN can be distinguished from the first in that it is used to establish exchanges of user data, e.g., data bearer traffic, between the UE 102 and one or more other data destinations without requiring the user data to be routed according to traditional data bearer traffic through the core network of the mobile service provider 104.

By way of example, the UE 102 can request a data session with one of the local devices 130, such as a networked computer, printer and/or VoIP phone. The request results in one or more signaling messages that are exchanged between one or more of the UE 102, the femtocell access point 110 and the core network of the mobile service provider network 104. The mobile service provider equipment, e.g., at the core network, examines the request and determines that the request was obtained by way of a femtocell access point 110. A further determination is made as to the nature of the request. This can include identification of a type of service requested and/or a destination of any subsequent user data exchange. Based on the type of service and/or the destination, one of the multiple APN identifiers is selected of otherwise identified. Still further action is taken to assign a corresponding IP address based on the selected APN identifier.

Continuing with the illustrative example, a request by the UE 102 to establish a data session with the PBX 132 and/or other local device 130, is examined by the service provider equipment, e.g., at the core network, to identify that the request is related to equipment and/or systems 130, 132 that are located at the same customer site 106 as the femtocell access point 110. Such determinations can be made from a predetermined association of local equipment and/or systems 130, 132 with the femtocell access point 110, e.g., accomplished at a time at which the femtocell access point 110 is provisioned and/or at a subsequent time, e.g., according to a reconfiguration, addition and/or deletion of one or more of the customer site equipment and/or systems 130, 132. A local IP address can be assigned to the UE 102 in relation to the local request. The local IP address can be used to establish a local data exchange, e.g., between one or more of the UE 102, the femtocell access point 110 and a local IP address of the local equipment and/or systems 130, 132.

By way of example, the femtocell access point 110 can include a local breakout feature that allows local user data packets to be exchanged between the local equipment and/or system 130, 132 and the UE 102, without being routed or otherwise distributed through core network nodes of the mobile service provider network 104. Beneficially, this technique can be used to offload local user data traffic, allowing the local user data traffic to proceed without occupying bandwidth of the backbone and/or further resources of the core network of the mobile service provider 104.

In some embodiments, the femtocell access point 110 can include a local internetworking module 118 that is not part of the core network and is configured to internetwork between the mobile cellular system and one or more other networks, such as a LAN and/or the Internet. In the illustrative example, the local internetworking module 118 includes a Local Gateway GPRS Support Node (L-GGSN), a Local Packet data network Gateway (L-PGW) or a combination of both.

The local internetworking module 118 can facilitate establishment of a user data traffic flow. For example, a request by the UE 102 to establish a packet flow with one or more of the local equipment and/or systems 130, 132 can be detected by way of the aforementioned signaling messages. The UE 102 can be assigned or otherwise associated with a local IP address by which IP packets can be transferred between the UE 102 and one or more of the local equipment and/or systems 130, 132, e.g., of a local sub-network at the customer site 106. For example, the local IP address can be determined by a local device at the customer site 106, such as the local internetworking module 118, and/or some other local router, such as a router of the CPE 114. In this manner, the local IP address can hide or otherwise shelter details of the local sub-network from an external network.

In at least some embodiments, the core network components of the mobile service provider network 104 can be used in relation to one or more of authentication, authorization and/or accounting. For example, a Home Location Register (HLR) and/or a Home Subscriber Server (HSS) of the core network can be used to authenticate the UE 102, e.g., based on the signaling messages. Likewise, provisioning of services according to access time, data rate, type of service, quality, and the like can be facilitated or otherwise blocked according to a subscriber's account associated with the UE 102. In at least some embodiments, one or more of the core network and/or the local systems at the customer site 106 can be used to facilitate an accounting related to the services. For example, the local interworking module 118 can monitor data usage, message traffic, voice traffic and the like, associated with locally offloaded traffic. The local internetworking module 118 can provide details of any accounting to other equipment of the mobile service provider 104 to facilitate proper charges for rendered services. In some embodiments, such locally offloaded traffic can be provided at virtually no added cost, i.e., not accounting to data limits, message counts and/or minutes. Alternatively, such locally offloaded traffic can be charged at equivalent rates as normal mobile cellular traffic routed through the core network, and/or at some other rate, e.g., a discounted rate to account for bandwidth and processing savings realized by the mobile service provider.

In some embodiments, the system 100 includes a femtocell local gateway 112. As illustrated (in phantom), the femtocell local gateway 112 can be in communication between the femtocell access point 110 and the CPE 114. The femtocell local gateway 112, when provided, can include one or more of a security gateway that terminates encrypted IP data connections to/from the femtocell access point 110, aggregates and/or validates signaling traffic handled by the femtocell access point 110, and/or interfaces with core network components of the mobile service provider network 104. It is understood that the femtocell access point 110 alone or in combination with the femtocell local gateway 112 can facilitate one or more simultaneous data sessions to the UE 102 and/or one or more other data sessions to more than one other UEs, e.g., of other family members of a residence, other employees of an enterprise, other patrons of a public venue, and the like.

In at least some embodiments, the femtocell local gateway 112 can include a local internetworking module 122, such as an L-GGSN/L-PGW module 122. The local internetworking module 122 can be provide in addition to or in place of the L-GGSN/L-PGW module 118 of the femtocell access point 110. Alternatively or in addition, the femtocell local gateway can include a user and/or control plane breakout module, referred to generally as a local breakout module 120. The local breakout module 120 can intercept and/or divert signaling and/or user messages according to one or more mobile cellular protocols, to provide local access to such packets normally destined to the core network of the mobile service provider 104, at the customer site 106.

It is understood that termination of the data session, and/or other situations, such as mobility of the UE 102, interference, e.g., to the RAN connection, and the like, may result in further signaling traffic between one or more of the UE 102, the femtocell access point 110 and/or network nodes of the core network of the service provider network 104. This can include signaling messages that facilitate data session termination, mobility of the UE 102, e.g., into and/or out of an area of coverage of the femtocell access point 110, interference to communications at or near the femtocell access point 110, and the like. To the extent that the UE 102 moves out of an area of coverage of the femtocell access point 110, mobility features of the applicable mobile cellular technology can be used to perform a handover to another cell, such as the macro cell 105.

To the extent that a handover of a UE 102 to the macro cell 105 occurs while the UE 102 is engaged in local breakout communications with one or more of the local equipment and/or systems 130, 132, user data traffic is re-directed and/or otherwise established through a user data bearer established through the network core of the mobile service provider network 104. Namely, user data packets flowing between the UE 102 and the local equipment and/or systems 130, 132 by way of the femto access point 110 are terminated in favor of another user data bearer between the UE 102 and a network node of the mobility core network of the mobile service provider network 104 by way of the macro cell 105.

Figure 2:
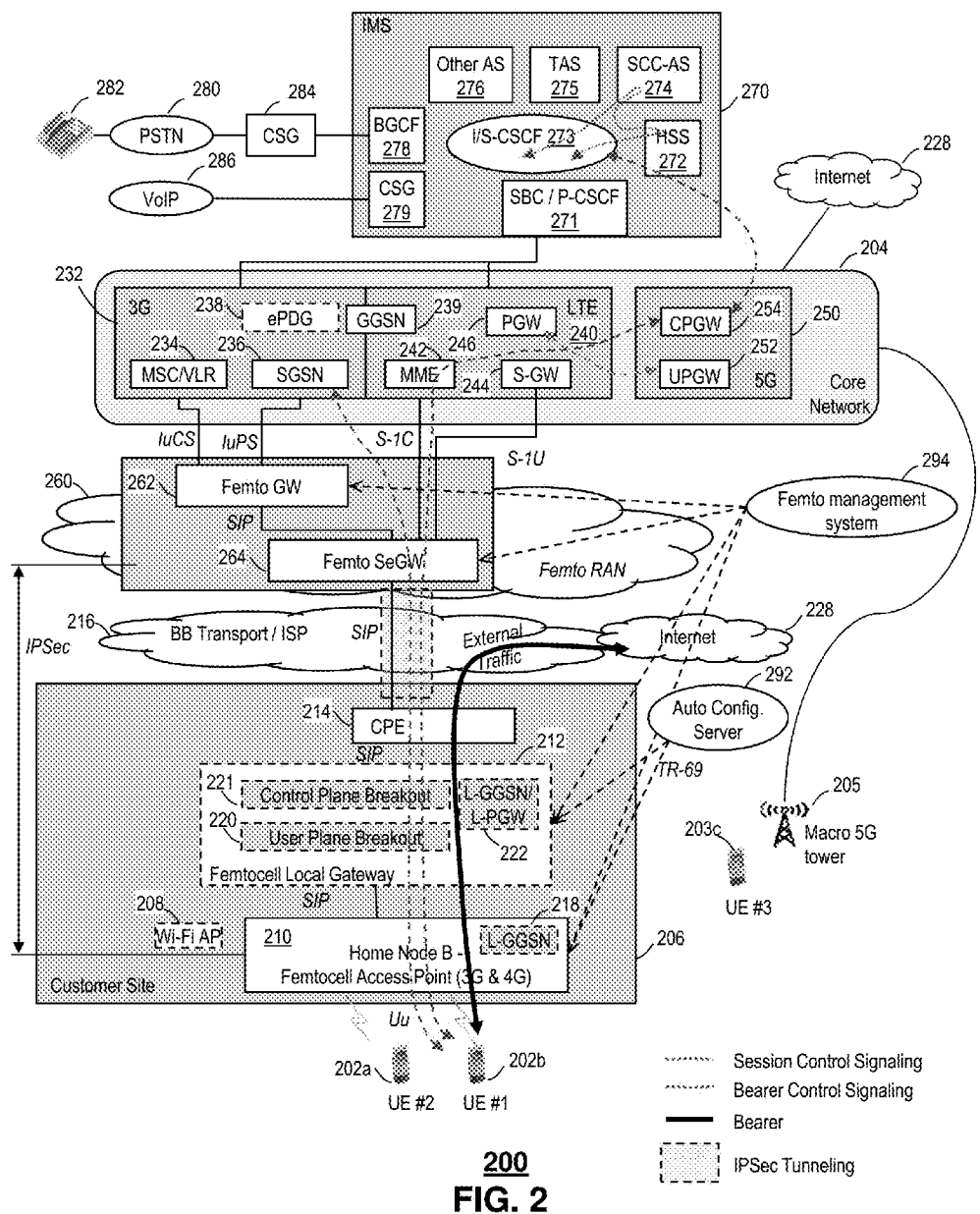
FIG. 2 depicts an illustrative embodiment of another mobile communications system.

FIG. 2 depicts an illustrative embodiment of another mobile communications system 200. The communications system 200 is configured to offload data traffic to another network, such as the Internet, using a local network connection at a customer site, and without requiring that related user data be handled, routed and/or otherwise accommodated by resources of the mobile service provider. In particular, the system 200 includes a mobility core network 204 that facilitates mobile cellular services to one or more wireless communications devices, referred to as mobile stations and/or UE 202a, 202b, generally 202. In some embodiments, communications between the UE 202 and the mobility core network 204 can be accommodated by way of a macro cell tower 205. Alternatively or in addition, the UE 202 can communicate with the mobility core network 204 by way of a small-cell, e.g., a femtocell access point 210 at a customer site 206. The customer site 206 can include CPE 214 that communicates with the local devices, e.g., through LAN connections and/or with remote devices, such as the mobility core network 204 or the Internet 228 through a broadband transport network 216. In at least some embodiments the CPE 214 includes or is otherwise in local communication with a wireless access point 208 (shown in phantom).

The femtocell access point 210 supports a RAN portion of a mobile telecommunication system that provides wireless connectivity between the femtocell access point 210 and the UE 202 within licensed portions of the radio frequency spectrum, e.g., according to a wireless communications protocol, such as 3G, 4G and/or 5G technologies. Signaling messages can be exchanged between the UE 202, the femtocell access point 210 and/or network nodes of the mobility core network 204. An example session control signaling path shown between the first UE 202a and a Control Plane Gateway (CPGW) 254 of a 5G core portion 250 of the mobility core network 204. The 5G core portion 250 can include a User Plane Gateway (UPGW) 252 to facilitate exchanges of 5G user plane data traffic that traverse the mobility core network 204.

The example core network 204 includes a 3G core portion 232 and a 4G LTE core portion 240. The 3G portion 232 and the 4G LTE core portions 240 can include network nodes typically found in traditional 3G and 4G LTE core networks, such as a Mobil Switching Center with an associated Visiting Location Register (MSC/VLR) 234, e.g., that includes subscriber data. The MSC/VLR 234 can be primary service delivery node for GSM/CDMA, e.g., responsible for routing voice calls and SMS as well as other services (such as conference calls, facsimile and/or circuit switched data. Other network nodes of the core network 204 include, without limitation, a Serving GPRS Support Node (SGSN) 236, a Gateway GPRS Support Node (GGSN) 240 and/or an evolved Packet Data Gateway (ePGW) 238. The ePGW 238 can facilitate interworking between the packet core, e.g., the 3G portion 232 and/or the 4G LTE portion 240 and untrusted non-3GPP networks that require secure access, such as a WiFi, LTE metro, and femtocell access networks, e.g., including the femtocell access point 210. Still other network nodes of the core network 204 can include, without limitation, a Mobility Management Entity 242, a Serving Gateway (S-GW) 244 and/or a PGW 246.

The example system 200 includes an IP Multimedia Subsystem (IMS) core network portion 270 that includes IMS application servers, such as a Service Centralization and Continuity (SCC) application server 274, a telephony application server 275 and/or one or more other IMS application servers 276. The IMS core portion 270 can include one or more of a Session Border Controller/Proxy Call Session Control Function (SBC/P-CSCF) 271, an Interrogating/Serving Call Session Control Function (I/S-CSCF) 273, a Home Subscriber Server (HSS) 272, a Breakout Gateway Control Function (BGCF) 278 and/or a VoIP and/or Circuit Switched Gateway (CSG) 279.

The SBC/P-CSCF 271 can be in communication with one or more of the 3G portion 232 and/or the 4G portion 240 of the mobility core network 204. The CSG 279 can be in communication with equipment including VoIP 286. The BGCF 278 can be in communication with a standard telephone instrument 282, e.g., through a Public Switched Telephone Network 280, by way of a circuit switched gateway (CSG) 284. Accordingly, the IMS core network 270 can facilitate voice calls according to one or more of PSGN 280 and/or VoIP 286. The mobility core network 204 is in further communication with the Internet 228, e.g., by way of the GGSN 239, the PGW 246 and/or the UPGW 252.

In some embodiments, the femtocell access point 210 can include a local internetworking module 218 that is configured to internetwork between mobile cellular communications with the UE 202 and one or more other networks, such as a LAN and/or the Internet 228. In the illustrative example, the local internetworking module 218 includes an L-GGSN, an L-PGW or a combination of both.

In some embodiments, the system 200 includes a femtocell local gateway 212. As illustrated (in phantom), the femtocell local gateway 212 can be in communication between the femtocell access point 210 and the CPE 214. The femtocell local gateway 212, when provided, can include one or more of a local internetworking module 222, such as an L-GGSN/L-PGW module 222. The local internetworking module 222 can be provide in addition to or in place of the L-GGSN/L-PGW module 218 of the femtocell access point 210. Alternatively or in addition, the femtocell local gateway 212 can include a local user plane breakout module 220 and/or a local control plane breakout module 221. The local breakout modules 220, 221 can intercept and/or divert signaling and/or user messages according to one or more mobile cellular protocols, to provide local access to such packets normally destined to the mobility core network 204.

Multiple APN's can be applied to the UE 202, with a first APN associated with local traffic, e.g., locally accessed Internet traffic, while a second APN is associated with all other traffic, e.g., including non-local access Internet traffic that would otherwise be handled by the mobile service provider network 204. In the illustrative example signaling messages between the UE 202, the femtocell access point 210 and/or the CPE 214 can be directed to the core network 204. Such messages can be used to detect or otherwise identify a request for service, a requesting device, and so on. The signaling messages can be processed to identify the device and/or associated subscriber, e.g., in association with authentication, authorization and accounting processing.

One or more network nodes or modules of the core network 204 can identify or otherwise distinguish whether the detected request for service can be accommodated by a local Internet breakout available at the customer site 206. To the extent that the request can be accommodated by the local Internet breakout, the first APN is used, and an IP address associated with the customer site 206 is associated with the requesting UE 202. For example, the local IP address can be provided or otherwise identified by a local router, such as a router of the CPE 214. Using the local IP address, user data associated with the request is serviced between the UE 202 and a remote Internet accessible source, by way of the local Internet connection 228. It is understood that the local Internet connection 228 can be provided by an Internet service provider servicing the customer site 206. Consequently, it is unnecessary to direct the user data traffic through the mobility core network 204, despite the user data traffic being handled by licensed spectrum of the RAN between the femtocell access point 210.

To the extent that the request cannot be accommodated by the local Internet breakout, the second APN is used, and an IP address determined by the mobile service provider is associated with the requesting UE 202. Any related user data traffic is routed by the nodes of the mobility core network per usual, e.g., by way of one or more of the SGSN 236, the GGSN 239, the ePDG 238, the S-GW 244, the PGW 246, and/or the UPGW 252, as the case may be.

The example system 200 can include a femtocell radio access network 260 that includes one or more femtocell gateway devices, such as a femtocell gateway 262 and/or a femtocell security gateway 264. The femtocell security gateway 264 can facilitate secure communications exchanges between the customer site 206 and the femtocell security gateway 264. The femtocell gateway 262 and/or the security gateway 264 can terminate encrypted IP data connections from very large numbers of femtocells, e.g., at multiple residences, enterprises, and various other locations. The femtocell gateway 262 and/or the security gateway 264 can aggregate and/or validate signaling traffic, authenticate each femtocell access point 210 and/or interfaces with core network nodes of the mobility core network 204, e.g., using standard protocols.

It is envisioned that a femtocell management system 294 can be used to coordinate operation among one or more of the femtocell access point 210, the femtocell local gateway 212, the femtocell gateway 262 and/or the femtocell security gateway 264. Such coordination can include, without limitation, provisioning, maintenance, and/or modifications of configurations of one or more of the devices and/or systems 210, 212, 262, 264. In some embodiments, the system 200 can include an auto configuration server 292. The auto configuration server 292 can be in communication with one or more of the femtocell access point 210 and/or the femtocell local gateway 212.

Figure 3:
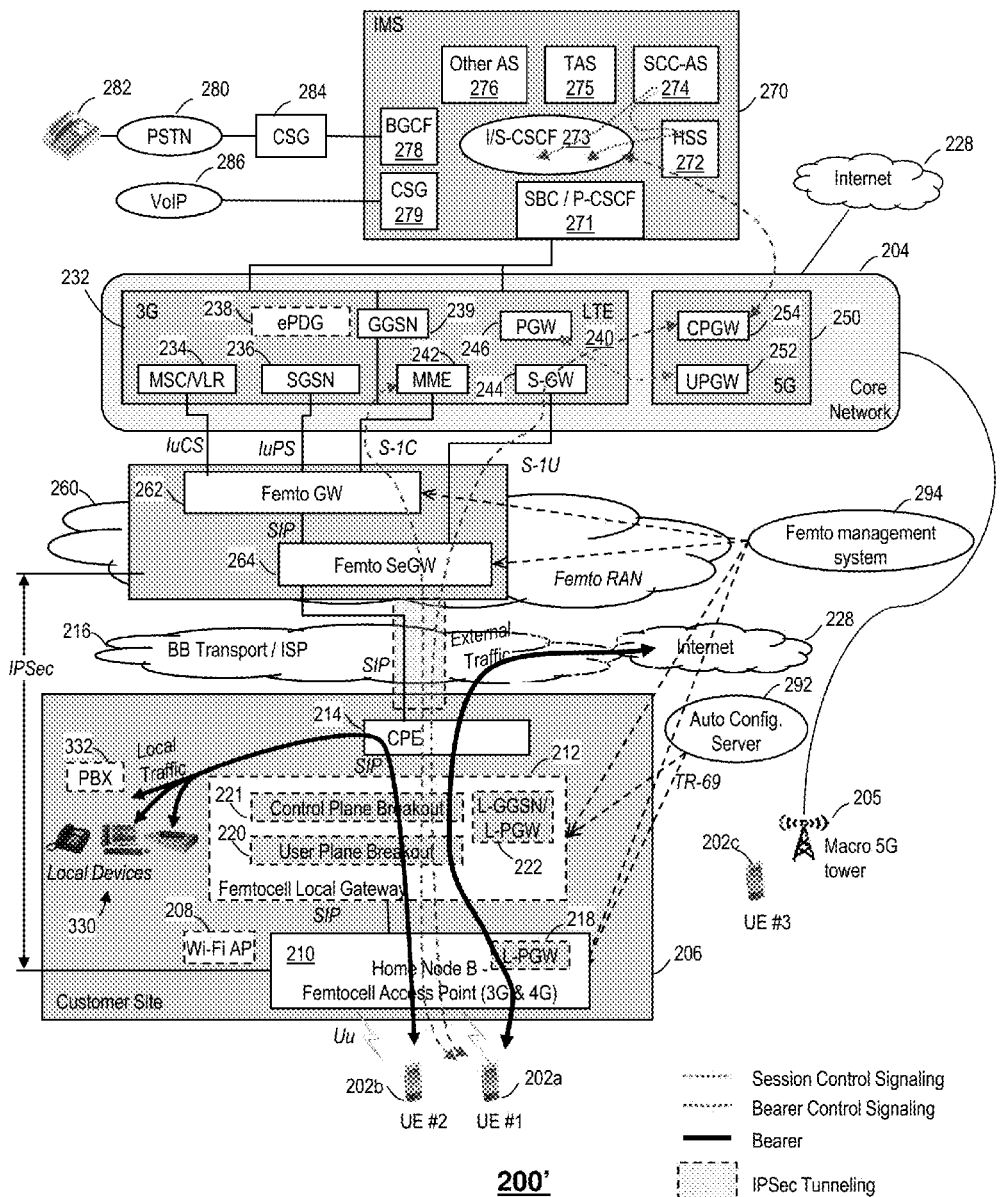
FIG. 3 depicts an illustrative embodiment of yet another mobile communications system.

FIG. 3 depicts an illustrative embodiment of yet another mobile communications system 200' that is a variation of the communication system 200 (FIG. 2) that provides data offload to local traffic. Once again, the data offload of local traffic occurs without requiring that related user data be handled, routed and/or otherwise accommodated by resources of the mobile service provider. In this example, the customer site 206 can include one or more local devices 330 and/or a PBX 332, wherein the CPE 214 communicates with the local devices 330 and/or PBX 332 through LAN connections. Alternatively or in addition, the CPE 214 communicates with remote devices, such as the mobility core network 204 or the Internet 228 through a broadband transport network 216.

One or more network nodes or modules of the core network 204 can identify or otherwise distinguish whether the detected request for service can be accommodated by a local Internet breakout available at the customer site 206. To the extent that the request is associated with one or more local devices and/or systems at the customer site 206, the first APN is used, and an IP address associated with the customer site 206 is associated with the requesting UE 202. For example, the local IP address can be provided or otherwise identified by a local router, such as a router of the CPE 214. Using the local IP address, user data associated with the request is serviced between the UE 202 and a local device or system 330, 332, e.g., by way of a LAN at the customer site 206. Consequently, it is unnecessary to direct the user data traffic through the mobility core network 204, despite the user data traffic being handled by licensed spectrum of the RAN between the femtocell access point 210.

In at least some embodiments, one or more network nodes or modules of the core network 204 can identify or otherwise distinguish whether the detected request for service is directed to a local device or system and/or whether the request can be accommodated by a local Internet breakout available at the customer site 206. To the extent that the request is directed to a local device or system and/or can be accommodated by the local Internet breakout, the first APN is used, and an IP address associated with the customer site 206 is associated with the requesting UE 202.

To the extent that the request is not directed to local devices or equipment and/or cannot be accommodated by the local Internet breakout, the second APN is used, and an IP address determined by the mobile service provider is associated with the requesting UE 202. Any related user data traffic is routed by the nodes of the mobility core network per usual, e.g., by way of one or more of the SGSN 236, the GGSN 239, the ePDG 238, the S-GW 244, the PGW 246, and/or the UPGW 252, as the case may be.

Figure 4A:
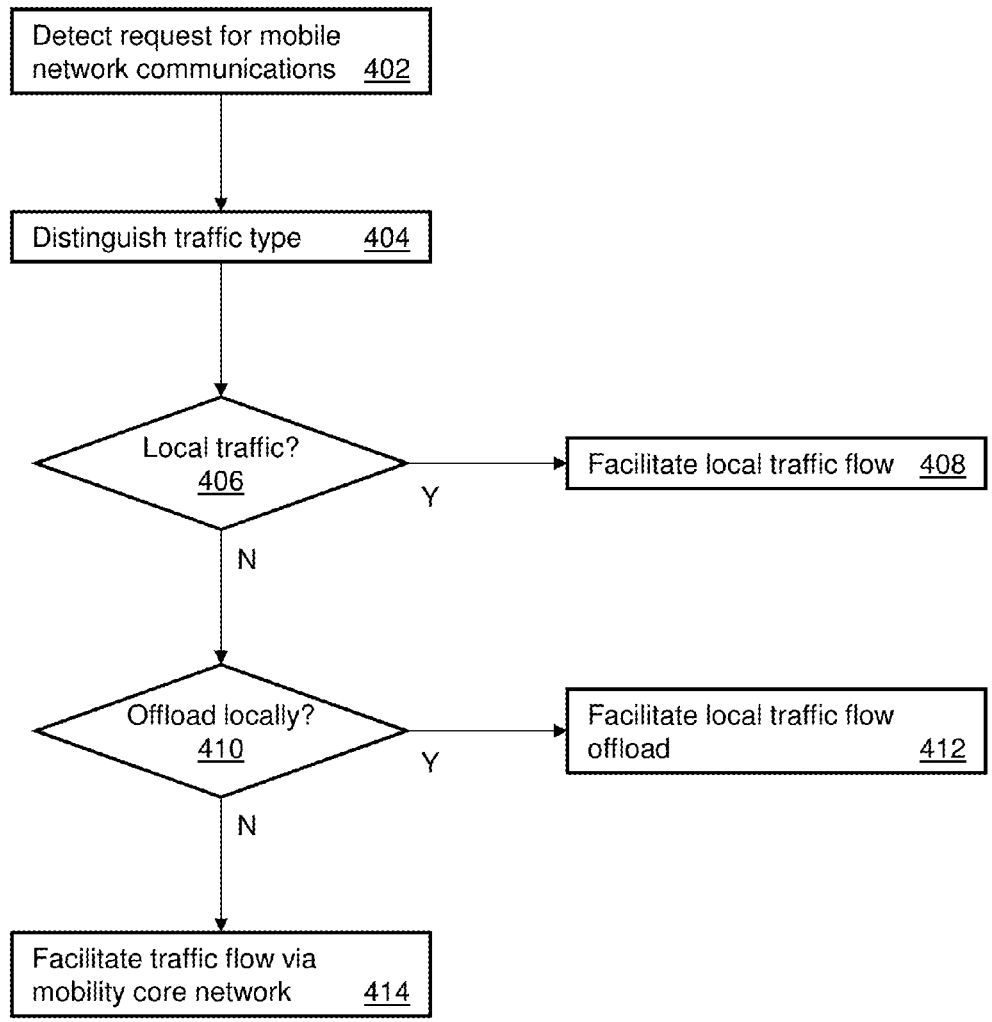
FIG. 4A depicts an illustrative embodiment of a process used in portions of the systems described in FIGS. 1-3.

FIG. 4A depicts an illustrative embodiment of a process 400 used in portions of the systems described in FIGS. 1-3. A request for mobile network communications is detected at 402. The request can be initiated by a mobile device 102, 202. For example, the request can result from a user accessing an application program of the mobile device, such as opening a web browser, sending a message, placing a phone call, and the like. According to one or more mobile cellular protocols, the mobile device can undergo an action to connect to the femtocell access point 110, 210. Such connections may be limited to mobile devices that have been previously authorized to attach to the femtocell access point.

The mobile device can be in one of an idle state or a connected state. In the idle state, the mobile device is known in the packet core, can have an IP address, but is not necessarily known in the femtocell. In the connected state, the mobile device is known at the packet core and at the femtocell level. In some applications, a default bearer is set up during a UE attach procedure, e.g., in response to an initial context setup request message from the UE. Other bearers can be established, as necessary according to usage. It is understood that in at least some embodiments, detection of requests for mobile network communications can be based on such bearer initiation and/or modification requests.

A traffic type is distinguished at 404. The traffic type can include an application, such as SMS, voice, browsing. The traffic type can be determined based on an associated application and/or other parameters, such as Quality of Service (QoS), bandwidth, delays, and the like.

A determination as to whether the traffic is local traffic is made at 406. In at least some embodiments, distinguishing of the traffic type can include identification of a source and/or destination of the requested mobile communications. Determination of the source and/or destination can be obtained in some instances from the request, and/or subsequent message traffic. Alternatively or in addition, a determination of the source/destination can be detected and/or otherwise inferred from other parameters. Such other parameters can include the type of application requested by the UE, a network address of an outgoing message from the UE, a telephone number of an outgoing call from the UE, inference from historical usage, e.g., previous calls and or messages, and the like.

To the extent that the traffic type is determined to be local traffic, a local traffic flow is facilitated at 408. Local traffic can include destination addressees of local equipment and/or systems 130, 132, 230, 232, use of short form telephone numbers, e.g., according to a PBX, and the like. As disclosed herein, a local IP address can be associated with the UE for related message traffic. For example, the local IP address can be identified at least in part by a local APN preconfigured in the UE. Alternatively or in addition, the local IP address can be provided by a local network element, e.g., a local router at the subscriber premises. In this regard, the local IP address may not be observable from external networks. The traffic flow can proceed according to the local IP address without requiring user data messages or user data traffic to be routed or otherwise pass through the mobile carrier network.

To the extent that the traffic type is not determined to be local traffic, a further determination is made at 410 as to whether the traffic can be offloaded locally. In some instances, the traffic can be related to a device accessible via the Internet. To the extent that the subscriber premises has Internet access, it would be possible to break out such IP traffic locally at the subscriber premises, allowing the related traffic to be routed through the local Internet access.

To the extent that the traffic can be offloaded locally, an offload local traffic flow is facilitated at 412. Once again, a local IP address for the UE can be associated with the requested traffic and the traffic flow can proceed according to the local IP address, without requiring user data messages or user data traffic to be routed or otherwise pass through the mobile carrier network.

To the extent that the traffic type is not local traffic and cannot be offloaded locally, a traffic flow via a mobility core network as facilitated at 414. As disclosed herein, a global IP address can be associated with the UE for related message traffic. For example, the global IP address can be identified at least in part by a global APN preconfigured in the UE. Alternatively or in addition, the global IP address can be provided by the mobile service provider. In this regard, the global IP address is generally observable from external networks. The traffic flow can proceed according to the global IP address, e.g., according to a tunneling protocol that routes related user data messages or user data traffic through one or more core nodes or modules of the mobile carrier network.

Figure 4B:
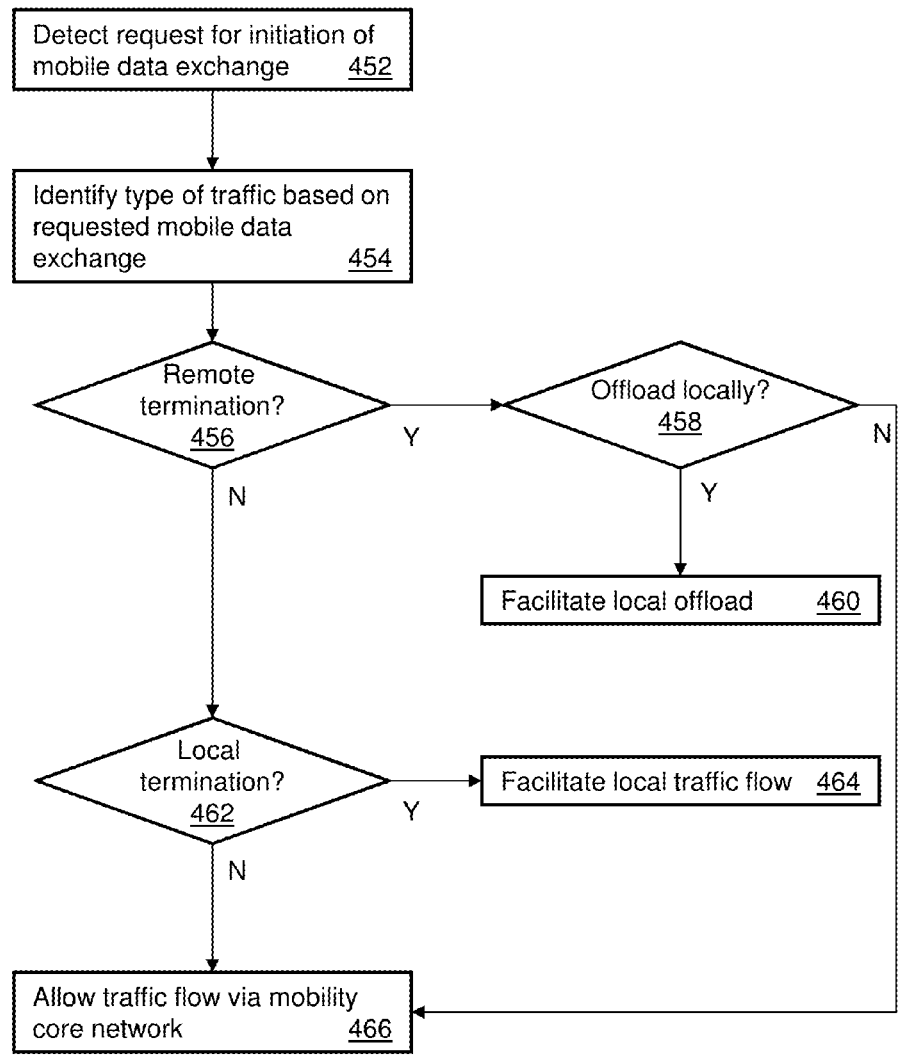
FIG. 4B depicts an illustrative embodiment of another process used in portions of the systems described in FIGS. 1-3.

FIG. 4B depicts an illustrative embodiment of another process 450 used in portions of the systems described in FIGS. 1-3. A request for initiation of a mobile data exchange is detected at 452. Once again, the request can result from a user accessing an application program of the UE, such as opening a web browser, sending a message, placing a phone call, and the like.

A type of traffic is identified at 454 based on the requested mobile data exchange. In a similar manner, the traffic type can be determined based on an associated application and/or other parameters, such as Quality of Service (QoS), bandwidth, delays, and the like identified by the request.

A determination as to whether the traffic requires a remote termination is made at 456. A remote termination can be based on one or more parameters, such as a destination address, a service type, a configuration of the network, a state of the network, and the like. Alternatively or in addition, parameters can include the type of application requested by the UE, a network address of an outgoing message from the UE, a telephone number of an outgoing call from the UE, inference from historical usage, e.g., previous calls and or messages, and the like.

To the extent that the traffic requires a remote termination, a further determination is made at 458 as to whether the traffic can be offloaded locally. In some instances, the traffic can be related to a device accessible via the Internet. To the extent that the subscriber premises has Internet access, it would be possible to break out such IP traffic locally at the subscriber premises, allowing the related traffic to be routed through the local Internet access.

To the extent that the traffic can be offloaded locally, a local traffic flow is facilitated at 460. Once again, a local IP address for the UE can be associated with the requested traffic and the traffic flow can proceed according to the local IP address, without requiring user data messages or user data traffic to be routed or otherwise pass through the mobile carrier network.

To the extent that the traffic type cannot be offloaded locally, a traffic flow via a mobility core network as facilitated at 466. Namely, a traffic flow can proceed according to a global IP address, e.g., according to a tunneling protocol that routes related user data messages or user data traffic through one or more core nodes or modules of the mobile carrier network.

To the extent that the traffic does not require a remote termination, a further determination is made at 462 as to whether the requested mobile data exchange includes a local termination. Determination of the source and/or destination can be obtained in some instances from the request, and/or subsequent message traffic. Alternatively or in addition, a determination of the source/destination can be detected and/or otherwise inferred from other parameters. Such other parameters can include the type of application requested by the UE, a network address of an outgoing message from the UE, a telephone number of an outgoing call from the UE, inference from historical usage, e.g., previous calls and or messages, and the like.

To the extent that the requested mobile data exchange does include a local termination, an offload local traffic flow is facilitated at 464. Local traffic can include destination addressees of local equipment and/or systems 130, 132, 230, 232, use of short form telephone numbers, e.g., according to a PBX, and the like. As disclosed herein, a local IP address can be associated with the UE for related message traffic. For example, the local IP address can be identified at least in part by a local APN preconfigured in the UE. Alternatively or in addition, the local IP address can be provided by a local network element, e.g., a local router at the subscriber premises. The traffic flow can proceed according to the local IP address without requiring user data messages or user data traffic to be routed or otherwise pass through the mobile carrier network.

To the extent that the requested mobile data exchange does not include a local termination, or cannot be offloaded locally, a traffic flow via the mobility core network as facilitated at 466, e.g., according to a global IP address as can be provided by a mobile service provider.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Although the various illustrative examples refer to traffic steering based on a communications request being initiated by a mobile device, e.g., the UE 102, 202, it is understood that similar traffic steering techniques can be applied to communications requests initiated by a local device, and/or initiated by a device that can access the UE via a local Internet connection provided at the subscriber premises. Once again, the UE can be associated with a local IP address that allows user data traffic to be exchanged with the UE over the femtocell RAN, the user data traffic would not have to be routed through core network nodes and/or modules of the mobile service provider's network.

Figure 5:
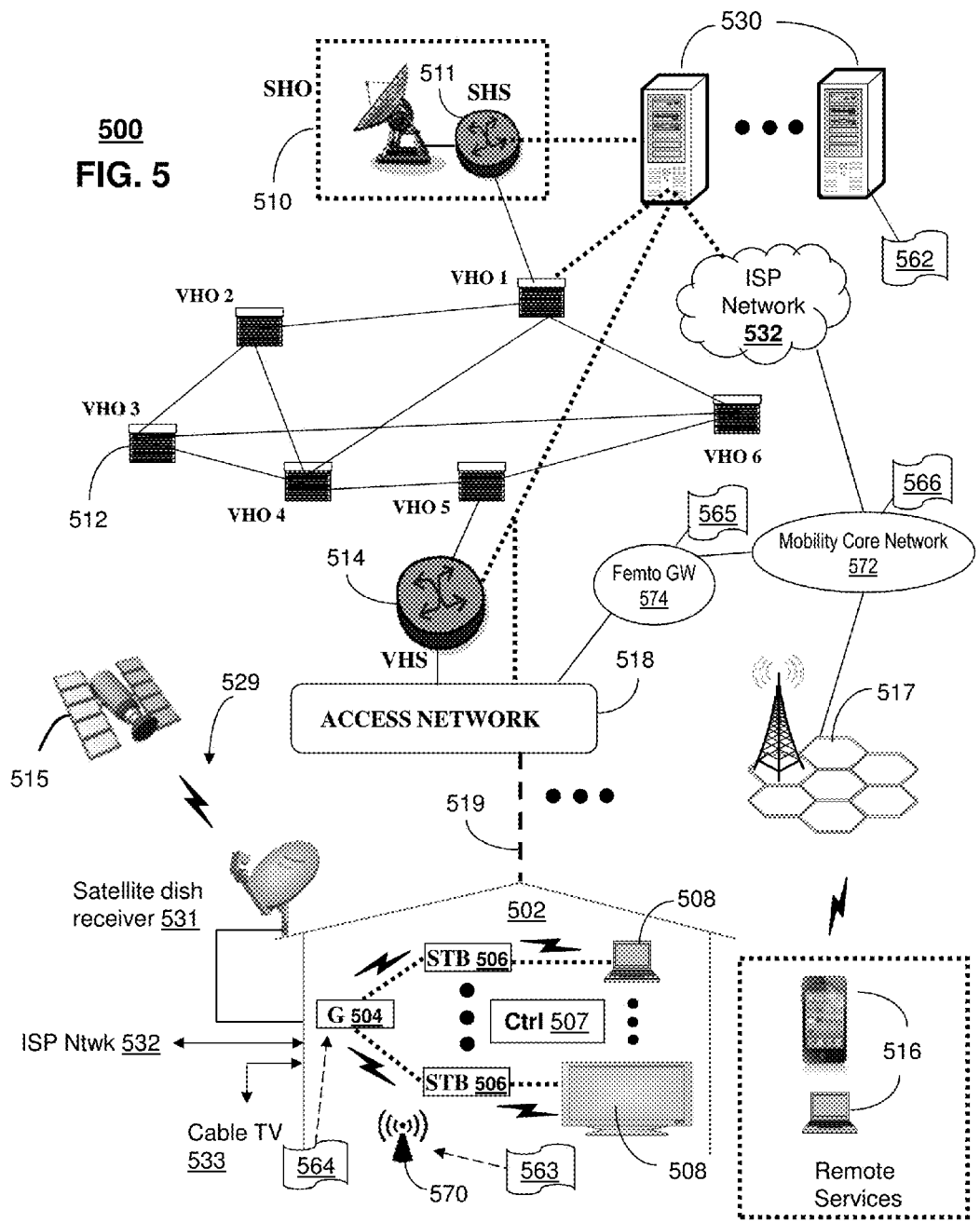
FIGS. 5-6 depict illustrative embodiments of communication systems that provide media services in cooperation with the systems of FIGS. 1-3 and the process of FIG. 4.

FIG. 5 depicts an illustrative embodiment of a communication system 500 for providing various communication services, such as delivering media content. The communication system 500 can represent an interactive media network, such as an interactive television system (e.g., an Internet Protocol Television (IPTV) media system). Communication system 500 can be overlaid or operably coupled with one or more of the communication systems 100, 200, 300 of FIGS. 1-3, as another representative embodiment of communication system 500. For instance, one or more devices illustrated in the communication system 500 of FIG. 5 identifies a mobile device in communication with a small-cell via managed spectrum. The small-cell is located at a subscriber premises and in further communication with a mobile network core. Each of a first IP address and a second IP address are associated with the mobile device, which accesses network traffic using one of the first IP address, the second IP address or both. Offload traffic associated with the mobile device is identified, wherein the offload traffic is exchanged between the mobile device and the small-cell at the subscriber premises using the managed spectrum. The offload traffic is associated with the first IP address, wherein user data are exchanged between the mobile device and other equipment at the subscriber premises without the user data being exchanged with the network core.

In one or more embodiments, the communication system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol. The VHS 514 can distribute multimedia broadcast content via an access network 518 to commercial and/or residential buildings 502 housing a gateway 504 (such as a residential or commercial gateway).

The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

The communication system 500 can also provide for all or a portion of the computing devices 530 to function as a traffic steering controller (herein referred to as traffic controller 530). The traffic controller 530 can use computing and communication technology to perform function 562, which can include among other things, the traffic steering techniques described by the example process 400 (FIG. 4A) and/or the example process 450 (FIG. 4B). For instance, function 562 of the traffic controller 530 can be similar to the functions described for one or more of the auto configuration server 292, 392, and/or the small-cell provisioning and/or operations server 294, 394 of FIGS. 2-3, and in accordance with the example process 400 (FIG. 4A) and/or the example process 450 (FIG. 4B). The gateway processors 504 and/or a small-cell or femto devices 570 provided within the home 502, or enterprise, can be provisioned with software functions 563 and 564, respectively, to utilize services of the traffic controller 530 and/or to facilitate traffic steering techniques described by the example process 400 (FIG. 4A) and/or the example process 450 (FIG. 4B). For instance, functions 563 and/or 564 of gateway processors 506 and femtocell devices 570 can be similar to the functions described for the customer equipment 114, 214 and/or femto access points 110, 210 and/or femto local gateways 112, 212 of FIGS. 1-3, and/or in accordance with the example process 400 (FIG. 4A) and/or the example process 450 (FIG. 4B).

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

The wireless access base station 517 is in communication with a mobility core network 572 that can be in further communication with other networks, such as the Internet and/or the ISP network 532. Likewise, one or more of the gateway processors 504 and/or the small-cell or femto devices 570 can be in communication with the mobility core network 572. In at least some embodiments, the gateway processors 504 and/or the small-cell or femto devices 570 are in communication with the mobility core network 572 through the access network 518 and a femtocell gateway 574 that may service a large number of femtocell access points, e.g., at a larger number of different premises. The femtocell gateway 574 and/or the mobility core network 572, can be provisioned with software functions 565 and 566, respectively, to utilize services of the traffic controller 530 and/or to facilitate traffic steering techniques described by the example process 400 (FIG. 4A) and/or the example process 450 (FIG. 4B), e.g., in association with the gateway processors 504 and/or a small-cell or femtocell devices 570.

Figure 6:
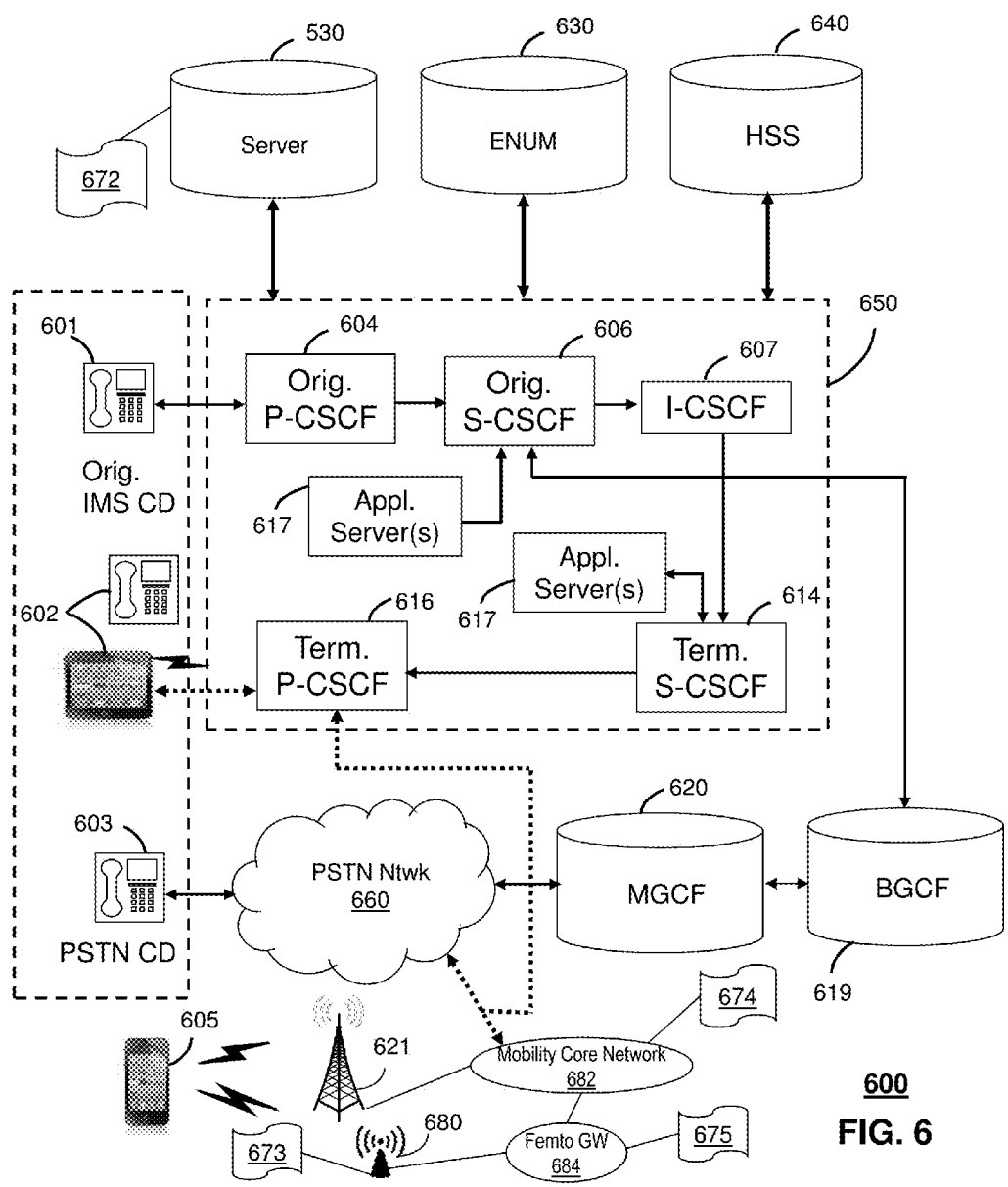

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with one or more of the mobile communication systems 100, 200, 300 of FIGS. 1, 2 and/or 3, and communication system 500 as another representative embodiment of communication system 500. A mobile device is identified in communication with a small-cell via managed spectrum. The small-cell is located at a subscriber premises and in further communication with a mobile network core. Each of a first IP address and a second IP address are associated with the mobile device, which accesses network traffic using one of the first IP address, the second IP address or both. Offload traffic associated with the mobile device is identified, wherein the offload traffic is exchanged between the mobile device and the small-cell at the subscriber premises using the managed spectrum. The offload traffic is associated with the first IP address, wherein user data are exchanged between the mobile device and other equipment at the subscriber premises without the user data being exchanged with the network core.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell 680, a WiFi router, a Digital Enhanced Cordless Telecommunications (DECT) base unit, or another suitable wireless access unit to establish communications with the IMS network 650 of FIG. 6. The cellular access base station 621 and/or the femtocell 680 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616. In at least some embodiments, the cellular base station 621 communications with the IMS network 650 and/or the PSTN network 660 by way of a mobility core network 682. The femtocell 680 can be in communication with the mobility core network through a femtocell gateway 684. The femtocell 680, the femtocell gateway 684 and/or the mobility core network 682, can be provisioned with software functions 673, 675 and 674, respectively, to utilize services of the traffic controller 530 and/or to facilitate traffic steering techniques described by the example process 400 (FIG. 4A) and/or the example process 450 (FIG. 4B), e.g., in association with the femtocell 680, the femtocell gateway 675 and/or the mobility core network 682.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The traffic controller 530 of FIG. 5 can be operably coupled to communication system 600 for purposes similar to those described above. The traffic controller 530 can perform function 562 and thereby provide traffic controlling, e.g., local breakout, services to the CDs 601, 602, 603 and 605 of FIG. 6, similar to the functions described for servers 292, 392, 294, 394, 630 of FIGS. 1-3 and 6 in accordance with the example process 400 (FIG. 4A) and/or the example process 450 (FIG. 4B). The CDs 601, 602, 603 and 605, can be adapted with software to perform function 672 to utilize the services of the traffic controller 530, similar to the functions described for communication devices 102, 202 of FIGS. 1-3 in accordance with method 400 (FIG. 4A) and/or method 450 (FIG. 4B). The traffic controller 530 can be an integral part of the application server(s) 617 performing function 672, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

Figure 7:
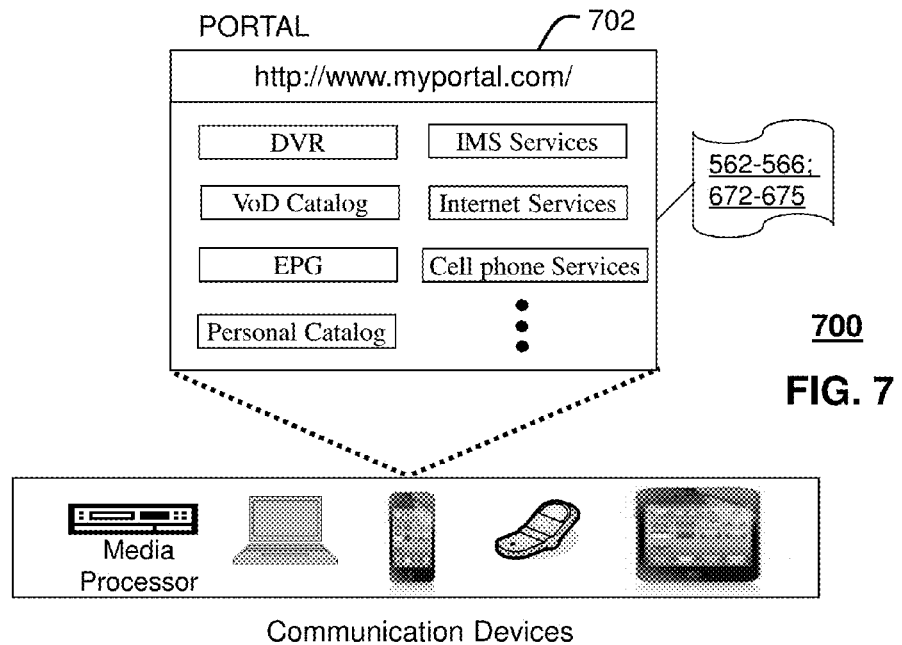
FIG. 7 depicts an illustrative embodiment of a web portal for interacting with the communication systems of FIGS. 1-3, and 5-6.

FIG. 7 depicts an illustrative embodiment of a web portal 702 of a communication system 700. Communication system 700 can be overlaid or operably coupled with one or more of the example mobile communication systems 100, 200, 300 of FIGS. 1, 2 and/or 3, communication system 500, and/or communication system 600 as another representative embodiment of the mobile communication systems 100, 200, 300 of FIGS. 1, 2 and/or 3, communication system 500, and/or communication system 600. The web portal 702 can be used for managing services of one or more of the mobile communication systems 100, 200, 300 of FIGS. 1, 2 and/or 3, and communication systems 500-600. A web page of the web portal 702 can be accessed by a Uniform Resource Locator (URL) with an Internet browser using an Internet-capable communication device such as those described in FIGS. 1, 2 and/or 3 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 602 can also be used for provisioning IMS services described earlier, provisioning Internet services, provisioning cellular phone services, and so on.

The web portal 702 can further be utilized to manage and provision software applications 562-566, and 672-675 to adapt these applications as may be desired by subscribers and/or service providers of mobile communication systems 100, 200, 300 of FIGS. 1, 2 and/or 3, and communication systems 500-600. For instance, users of the services provided by one or more of the traffic manager 530, the auto configuration server 292, 392, the femto provisioning and/or operations servers 294, 394, the femto local gateways 112, 212, 312, can log into their on-line accounts and provision the servers 110 or server 530 with CPE 114, 214 identification, subscriber information, APNs associated with UEs 102, 202, and so on. Service providers can log onto an administrator account to provision, monitor and/or maintain the systems 100, 200, 300 of FIGS. 1, 2 and/or 3 or server 530.

Figure 8:
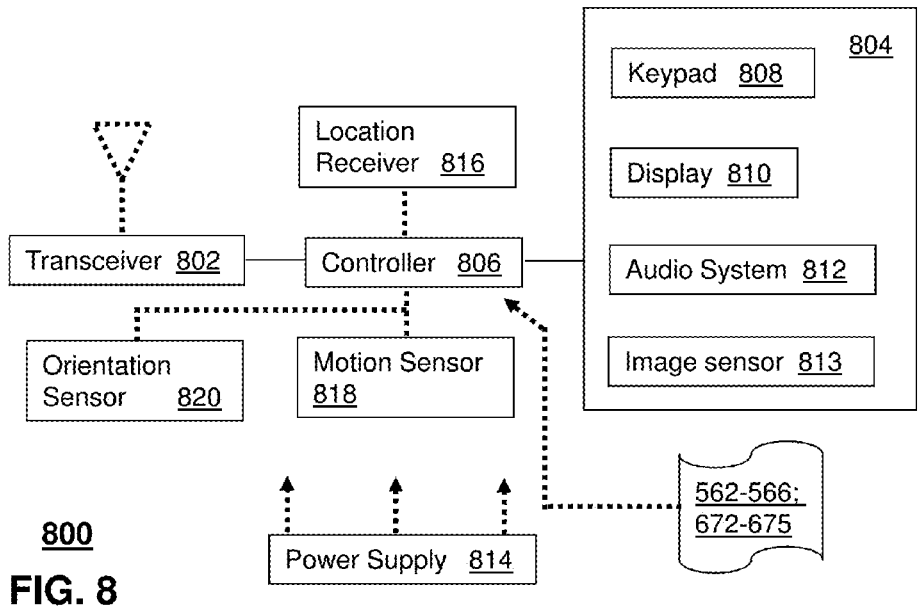
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1, 2 and/or 3, and FIGS. 5-5 and can be configured to perform portions of the example process 300 of FIG. 3.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices, e.g., devices 112, 212, 312, 292, 392, 294, 394 of FIGS. 1, 2 and/or 3, the gateway server 504, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in the systems of FIGS. 1, 2 and/or 3, communication systems 500-600 of FIGS. 5-6 such as a gaming console and a media player. In addition, the controller 806 can be adapted in various embodiments to perform one or more of the functions 562-566 and 672-675, respectively.

Upon reviewing the aforementioned embodiments, it would be evident to an artisan with ordinary skill in the art that said embodiments can be modified, reduced, or enhanced without departing from the scope of the claims described below. For example, within the small-cell femto environment, at least some of activities can be selectively steered and re-distributed outside of the carrier network. Such activities can include, for example in-home, human-to-machine communication with other smart devices such as home appliance, security system (e.g., microwave oven refrigerator, sprinklers, smoke alarm, etc.). Other example activities include, without limitation, in-home video sharing between family members, in-company video conference among company co-workers, in-company work flow communications in-enterprise, in-store business-to-consumer advertisement, in-store consumer-to-consumer product chat, in-stadium sports chat, in-stadium commercial broadcast, and the like. Other embodiments can be used in the subject disclosure.

According to the illustrative examples disclosed herein, a subscriber can simultaneously use a service provider service such as video call with the service provider network while at home, connecting and downloading a set of pictures from their phone to a home computer with two distinguished IP addresses one provided by local router the other one from service provider's own subscriber IP address. Consumers toady are equipped with wide range of intelligent communications devices including Smartphone's and PDA's, This is not to mention there are additional abundant smart appliances (e.g., TV, PC, fax machine, smoke alarm, security camera, microwave oven, refrigerator, microwave oven, sprinkler, etc.) which are either resided at Home, The techniques disclosed herein include 3G L-GGSNs (Localized GGSN) and/or LTE L-PGWs (Localized PDN Gateway), which can be integrated with a small cell, and/or a home network gateway, e.g., a residential gateway, a media processor, a cable modem, or any other suitable network device.

The L-GGSN and/or the L-PGW are examples of devices that can be used to implement traffic steering and separation of local traffic and remote traffic, wherein only the remote traffic goes through the service provider network, while all of the remaining local traffic goes through the home network and/or enterprise network. As a result, it is no longer necessary or required for the entire data traffic to go through a service provider's network. Within the WiFi, small cell femto environment, at least some of these activities can be selectively steered and/or re-distributed outside of the carrier network. This can include small-cells and/or WiFi access points as may be available at a subscriber location.

Example types of traffic can include, without limitation, in-home human-to-machine communication with other smart devices such as home appliance, security system, (e.g., microwave oven refrigerator, sprinklers, smoke alarm, etc.), in-home video sharing between family members, in-company video conference among company co-workers, in-company work flow communications in enterprise, in-store business-to-consumer advertisement, in-store consumer-to-consumer product chat, in-stadium sports chat, in-stadium commercial broadcasts, and the like. It is understood that in at least some applications, whether data is steered or otherwise broken out locally can depend, at least in part, on the type of data alone or in combination with a destination of a related data exchange.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
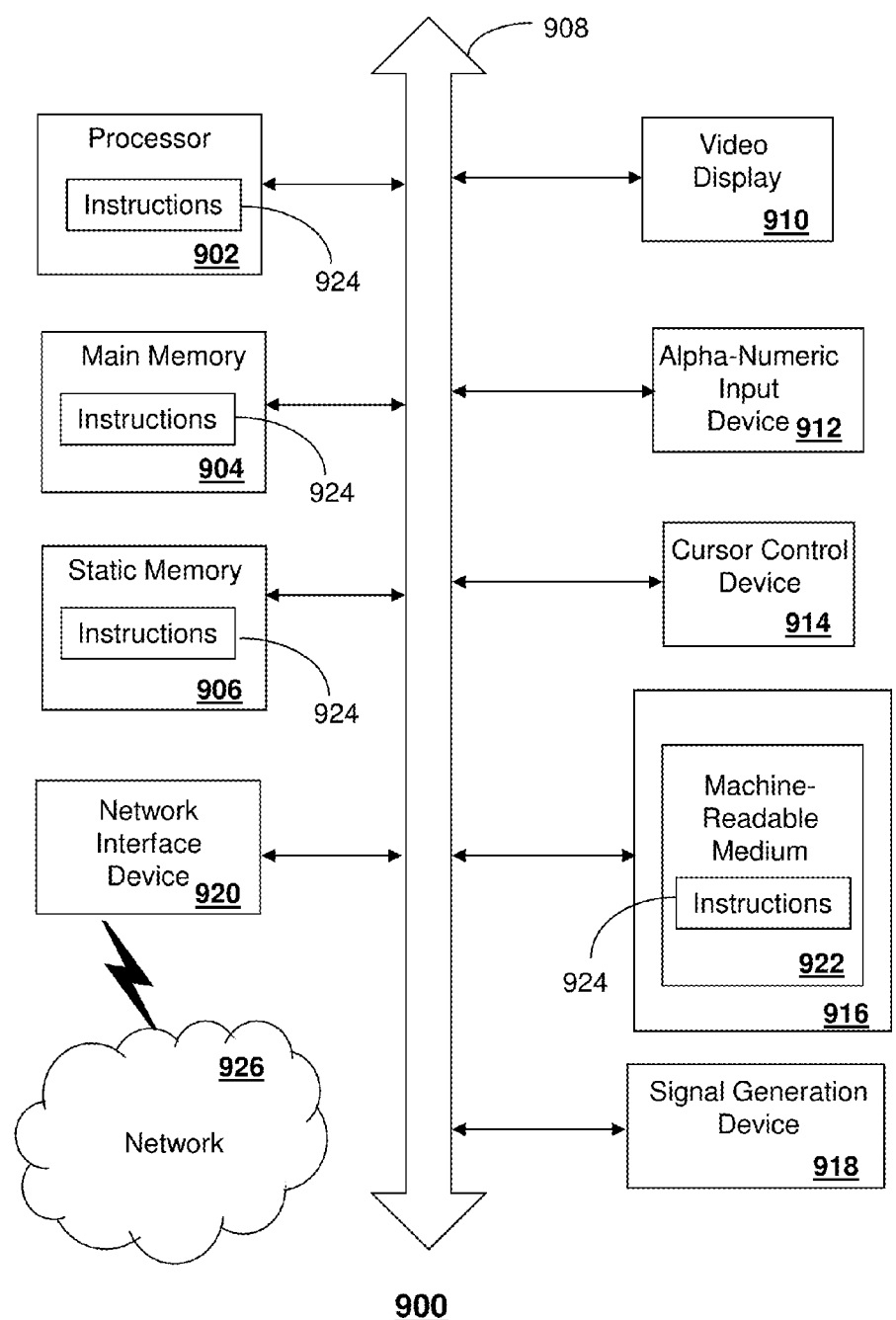
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the traffic controlling device 530, the media processor 506 the femtocell access point 110, 210, the femtocell local gateway 112, the internetworking module 118, 120, 122, the CPE 114, 214, the local devices 130, 330 and/or PBX 132, 332, any of modules and/or network nodes of the mobility core networks 104, 204, and other devices of FIGS. 1-3 and/or 5-8. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
identifying a mobile device, wherein the mobile device is in communication with a small-cell access point via managed cellular frequency spectrum, wherein the small-cell access point is located at a subscriber premises, and wherein the small-cell access point is in further communication with a network core of a mobile cellular network that services network traffic among a plurality of cellular access points comprising a macro-cell base station and the small-cell access point;
associating each of a first Internet protocol (IP) address and a second IP address with the mobile device, wherein the mobile device accesses the network traffic using one of the first IP address, a second IP address or both;
distinguishing between offload traffic and non-offload traffic associated with the mobile device, wherein the offload traffic and the non-offload traffic are exchanged between the mobile device and equipment at the subscriber premises using the managed cellular frequency spectrum; and
associating the offload traffic with the first IP address, wherein the offload traffic comprises a signaling portion and a user data portion, wherein user data messages of the user data portion are exchanged between the mobile device and the equipment at the subscriber premises without the user data messages being exchanged between one of the mobile device, the equipment at the subscriber premises or both and the network core,
wherein the mobile device is associated with a first access point name identifier based on the first IP address and a second access point name identifier based on the second IP address.

2. The device of claim 1, wherein the second IP-address comprises a global IP address, and wherein the first IP-address comprises a local IP address.

3. The device of claim 2, wherein the operations further comprise detecting a request for mobile network communications initiated by the mobile device, wherein the distinguishing between offload traffic and non-offload traffic associated with the mobile device is responsive to the detecting of the request.

4. The device of claim 1, wherein the offload traffic comprises user data exchanged between the mobile device and a device local to the subscriber premises.

5. The device of claim 1, wherein the offload traffic comprises user data exchanged between the mobile device and an Internet access local to the subscriber premises.

6. The device of claim 1, wherein the operations further comprise determining a state of the mobile cellular network, wherein the associating of the offload traffic with the first IP address is based on the state of the mobile cellular network.

7. The device of claim 1, wherein the network core exchanges signaling messages of the signaling portion with the mobile device.

8. A method, comprising:
identifying, by a processing system including a processor, a mobile device in communication with a small-cell access point via managed cellular frequency spectrum, wherein the small-cell access point is located at a subscriber premises, and wherein the small-cell access point is in further communication with a network core of a mobile cellular network;
associating, by the processing system, each of a first Internet protocol (IP) address and a second IP address with the mobile device, wherein the mobile device accesses network traffic using one of the first IP address, the second IP address or both;
identifying, by the processing system, offload traffic associated with the mobile device, wherein the offload traffic is exchanged between the mobile device and the small-cell access point at the subscriber premises using the managed cellular frequency spectrum; and
associating, by the processing system, the offload traffic with the first IP address, wherein user data are exchanged between the mobile device and other equipment at the subscriber premises without the user data being exchanged between one of the mobile device, the small-cell access point or both and the network core, wherein the mobile device is associated with a first access point name based on the first IP address and a second access point name based on the second IP address.

9. The method of claim 8, wherein the first IP address is associated with the first access point name and the second IP address is associated with the second access point name.

10. The method of claim 9, further comprising detecting, by the processing system, a request for mobile network communications initiated by the mobile device, wherein the identifying of the offload traffic is responsive to the detecting of the request.

11. The method of claim 8, wherein the offload traffic comprises user data exchanged between the mobile device and a device local to the subscriber premises.

12. The method of claim 8, wherein the offload traffic comprises user data exchanged between the mobile device and an Internet access local to the subscriber premises.

13. The method of claim 8, further comprising determining, by the processing system, a state of the mobile cellular network, wherein the associating of the offload traffic with the first IP address is based on the state of the mobile cellular network.

14. The method of claim 8, wherein the network core exchanges signaling messages with the mobile device, wherein the signaling messages facilitate establishment of the offload traffic that comprises the user data.

15. A non-transitory, machine-readable storage medium, comprising executable instructions that, when executed by a processing system including a processor, facilitate performance of operations, comprising:
identifying a wireless communications device in communication with a small-cell access point via managed cellular frequency spectrum, wherein the small-cell access point is located at a subscriber premises, and wherein the small-cell access point is in further communication with a network core of a mobile cellular network;
determining a wireless communications device address comprising the first IP address and a second IP-address, wherein the wireless communications device accesses network traffic using the wireless communications device address;
determining network messages associated with the wireless communications device that can be steered based on the wireless communications device address, wherein the network messages are exchanged between the wireless communications device and the small-cell access point at the subscriber premises using the managed cellular frequency spectrum; and
associating the network messages with the first IP-address, wherein user data are exchanged between the wireless communications device and other equipment at the subscriber premises by way of the network messages, without the user data being exchanged between one of the wireless communications device, the small-cell access point or both and the network core,
wherein the wireless communications device is associated with a first access point name based on the first IP-address and a second access point name based on the second IP-address.

16. The non-transitory, machine-readable storage medium of claim 15, wherein the first IP address comprises a local IP address and wherein the second IP address comprises a global IP address.

17. The non-transitory, machine-readable storage medium of claim 16, wherein the operations further comprise detecting a request for mobile network communications initiated by the wireless communications device, wherein the determining of the network messages associated with the wireless communications device is responsive to the detecting of the request.

18. The non-transitory, machine-readable storage medium of claim 15, wherein the network messages comprise user data exchanged between the wireless communications device and a device local to the subscriber premises.

19. The non-transitory, machine-readable storage medium of claim 15, wherein the network messages comprise user data exchanged between the wireless communications device and an Internet access local to the subscriber premises.

20. The non-transitory, machine-readable storage medium of claim 15, wherein the network core exchanges signaling messages with the wireless communications device to facilitate establishment of an exchange of the network messages.

* * * * *